United States Patent Office 3,401,178
Patented Sept. 10, 1968

3,401,178
METHOD OF RACEMIZING D-α-ACETYLAMIDE-α-(SUBSTITUTED-BENZYL)-PROPIONITRILES
Raymond A. Firestone, Fanwood, and Donald F. Reinhold and Meyer Sletzinger, North Plainfield, N.J., assignors to Merck & Co., Inc., Rahway, N.J., a corporation of New Jersey
No Drawing. Continuation-in-part of application Ser. No. 309,378, Sept. 19, 1963. This application Dec. 29, 1966, Ser. No. 605,587
13 Claims. (Cl. 260—340.5)

ABSTRACT OF THE DISCLOSURE

A process is described for racemizing an optically active nitrile in which the nitrile group and an α - carboxylic acylamino group are both substituents on a quaternary substituted carbon which comprises treating said nitrile with a base capable of replacing the hydrogen on an amide nitrogen.

This application is a continuation-in-part of our co-pending application Ser. No. 309,378, filed Sept. 19, 1963, now abandoned.

This invention relates to a method of racemizing organic nitriles in which the nitrile group and an α - carboxylic acylamino group are both substituents on a quaternary substituted carbon. More specifically, this invention relates to a method including a continuous method of racemizing an optically active nitrile of the above description by treating the said nitrile with at least 0.001 mole per mole of nitrile present, of a catalyst which is a base capable of replacing the hydrogen on an amide nitrogen such as a cyanide, a hydroxide, an alkoxide, a hydride, a phenoxide or a carbonate of an alkali or alkaline earth metal or a quaternary ammonium cyanide. Still more specifically, this invention relates to a method of racemizing a compound of the formula

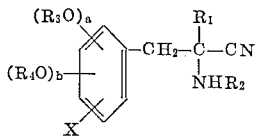

in which $R_1$ is lower alkyl, $R_2$ may be lower alkanoyl, lower alkenoyl, benzoyl, chlorobenzoyl, bromobenzoyl, toluyl, dimethylbenzoyl, trifluoro lower alkanoyl and phenyl lower alkanoyl and $R_3$ and $R_4$ may be hydrogen, lower alkanoyl, methyl, or together, when $R_3O$ and $R_4O$ are ortho to one another, methylene, and X is hydrogen, halogen, lower alkyl or trifluoromethyl, $a$ being 0, 1 or 2 and $b$ being 0 or 1, the said method being by the above procedure.

The development of α - methyl - 3,4 - dihydroxy - phenylalanine as an important new antihypertensive drug has brought to the fore the need for certain new developments in its chemistry. This antihypertensive drug is synthesized by a four or five step synthesis and then is resolved into its optical isomers, because the antihypertensive effect resides only in the L form. This results in an accumulation of unusable D form. Many efforts have been made to find ways in which the D form may be regenerated or racemized into the L form so as to permit it also to be used. These methods so far have required a degradation of the D compound to an intermediate in order that it might be recycled into the synthesis, since no practical way of racemizing the amino acid directly was known. More recently, a method of synthesizing the L form has been developed which provides for the resolution into the optical isomers at the aminonitrile stage by forming the N - acyl derivative. Although this method permitted the recycling of the D form, this recycling had to be done by the regeneration of the starting ketone through a degradation step and resynthesis of the aminonitrile. All this process did was to reduce to one step the degradation necessary to recover the unusable D form.

Similar problems arise with other tertiary aminonitriles used in the preparation of alpha substituted α - amino acids such as α - methyl - 5 - hydroxy tryptophane, α-methylhistidine, α - methyl tryptophane and the like. There is thus a need for a good method of racemizing an α - aminonitrile having a quaternary carbon in the alpha position.

In the past, racemization of α - amino acids and their derivatives have been readily carried out when the α-amino acid has a hydrogen on the alpha carbon. Racemization could then proceed through an enolization or similar unsaturated form. In the past, it has been regarded as impossible to racemize a quaternary carbon, because it could not form such a double bond without splitting the molecule apart. Yet, this is the problem faced in this particular situation.

We have found that it is possible to racemize a nitrile in which an α - acylamino group and the nitrile group are both substituents on a quaternary carbon, especially the α - acylamino α - loweralkyl hydroxy, alkanoyloxy or methoxyphenylpropionitriles and higher alkyl nitriles which are illustrated by the formula above, when these compounds are treated with a base capable of removing a hydrogen from an amide nitrogen. Such catalysts are principally the cyanides, hydrides and carbonates of alkali metals or the cyanides of quaternary ammonium compounds.

It is very unexpected and unprecedented that a quaternary carbon having only nitrogen or carbon bonded to it can be made to racemize with any ease. One possible explanation on which we have speculated is that cyanide ion separates with the concurrent formation of a double bond to the nitrogen, followed by recombination of the cyanide ion. This is especially backed by the fact that the effective catalysts are those bases capable of extracting a hydrogen from an amide nitrogen. However, other mechanisms are also possible and we do not wish to be limited to any theoretical explanation of this reaction.

It is an advantage of our invention that its use permits the recycling of the undesired enantiomorph in the synthesis of amino acids with a minimum of cost. It is a further advantage of our invention that the recycling of the undesired enantiomorph is accomplished without requiring degradation to the precursor ketone. The compound which is resolved remains the same, and can be recycled in the resolution process.

The compounds which may be racemized by the process of this invention include any nitrile in which a quaternary carbon is bonded to the nitrile group and to an acylamino group. Such compounds are normally prepared by a Strecker reaction on ketones, this reaction consisting of condensation with ammonium cyanide to form the amino nitrile, followed by acylation of the amino nitrile with an acid anhydride. The racemates thus produced are resolved by chemical methods or by direct crystallization. Examples of the compounds which may be used include such compounds as α-methyl-α-acetaminopropionitrile, α - phenyl α - acetaminopropionitrile, α-benzyl-α-acetaminopropionitrile, α,α-diphenyl-α-acylaminoacetonitrile (prepared from benzophenone), 1-cyano-1-acetaminocyclohexane (prepared from cyclohexanone), α-imidazolylmethyl-α-acetamino lower alkyl nitrile, α - 5-hydroxy-3-indolylmethyl-α-acetamino lower alkyl nitriles and the like.

The acyl groups on the acylamino substituents may be any carboxy carboxylic acyl such as lower alkanoyl, lower alkenoyl, benzoyl and substituted benzoyl such as chloro- and bromobenzoyl, toluyl, dimethylbenzoyl, trifluoroacetyl and phenyl lower alkanoyl such as phenylacetyl. The nature of the acyl group is not affected by the reaction except as to added substituents which may be base sensitive. Such substituents must be absent.

The compounds for which this invention are especially useful are the α-acylamino-α-substituted benzyl of lower nitriles of the structure

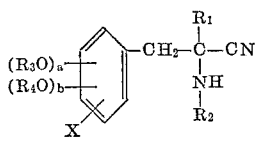

in which $R_1$ is lower alkyl, $R_2$ is lower alkanoyl, lower alkenoyl, benzoyl, chlorobenzoyl, bromobenzoyl, toluyl, dimethylbenzoyl, trifluorolower alkanoyl or phenyl lower alkanoyl, $R_3$ and $R_4$ may be hydrogen, lower alkanoyl, methyl or together, when $R_3O$ and $R_4O$ are ortho to one another, methylene X may be hydrogen, lower alkyl, halogen or trifluoromethyl, $a$ may be 0, 1 or 2 and $b$ may be 0 or 1. The most important compounds usable in this invention are the compounds of the structure

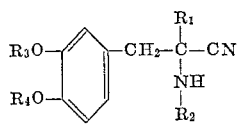

in which $R_1$, $R_2$, $R_3$ and $R_4$ are defined as above. These are important because they are formed as intermediates in the synthesis of α-methyl-3,4-dihydroxyphenylalanine, intermediates which can be readily resolved by a direct resolution process. The process of this invention thus is a companion step whereby the unwanted D isomer is recycled directly into the resolution, after undergoing racemization to the DL form. It is the immediate need of a good commercial process for eliminating the accumulation of the unwanted D isomer in the synthesis of this commercial antihypertensive which makes this group of compounds the most important ones for which this process is contemplated.

The process of this invention is carried out by treating the enantiomorph which is to be racemized with a base capable of removing the hydrogen from an amide nitrogen. The process may be carried out in a solvent or in a melt of the material being racemized. It may be carried out at temperatures varying from ambient to quite high temperatures. The amount of recemization is a function of the combination of process viriables: time, temperature, concentration of acylaminonitrile, quantity of catalyst, and nature of catalyst. Generally, the rate of reaction of the racemization follows the energy of activation equation $(K=Ae^{-Ea/RT})$. Usually temperatures greater than 100° C., preferably from 140° C. and up, limited only by boiling points of solvents or use of pressure are preferred for carrying out the racemization. Thus at lower temperatures, much longer times are needed for the reaction to proceed toward completion than at the generally preferred higher temperatures. At room temperature L-α-acetamido-α-vanillylpropionitrile is 12% racemized in dimethysulfoxide by sodium hydride in 16 hours but is completely racemized at 190°C. in a few minutes.

The catalysts which effect the racemization in the process of this invention are bases strong enough in alkalinity to extract a proton from an amide nitrogen. Generally, they are bases whose cations are alkali or alkaline earth metal ions or quaternary ammonium ions. The anion may be hydroxyl, carbonate, cynanide, hydride, or even phenoxide (e.g. when sodium hydride is added to D-α-methyl-α-vanillylpropionitrile in solution in the cold hydrogen is evolved and the sodium phenolate salt of the aminonitrile is formed, which solution on heating readily racemizes). Preferably, the anion is cynaide since the mass action of extra cyanide ion forces the equilibrium of the above reaction sequence to the left. When other anions are used, yields are lower due to decomposition, probably by deacylation of the amine. Consequently, in the case of such anions only limited amounts (less than 0.6 mole) of such catalysts should be used, to reduce the change of such decomposition, whereas with the cyanides such a limitation is less important. The catalysts usable thus include the cyanides, hydroxides, hydrides and carbonates of the alkali and alkaline earth metals. For example, compounds such as sodium cyanide, sodium hydride, sodium carbonate, potassium cyanide, potassium hydride, potassium carbonate, lithium cyanide, rubidium cyanide, cesium cyanide and the like may be used. It also includes the cyanides of a quaternary ammonium compound, especially the cyanides of the very basic tetraalkyl ammonium compounds such as tetraethylammonium cyanide. Especially preferable as a catalyst is an alkali cyanide such as sodium cyanide. The catalyst is used in amounts of at least 0.001 mole per mole of acylaminonitrile present. Preferably usage is of the order of 0.4 to 0.6 moles (usually 0.5 are employed) per mole of nitrile.

Although a solvent is preferred, the racemization process of this invention proceeds also in a melt of the acylaminonitrile being racemized. Temperature is more important than the presence or absence of solvent, but the use of solvents permits proper temperatures to be reached. In addition, certain solvents such as the sulfoxides dissolve the catalyst and permit much more intimate contact. They also are known to facilitate proton removal under non-stereospecific conditions. For these reasons they are greatly preferred. The solvent must, however be free of hydroxyls. Usable solvents thus can be defined as high-boiling non-hydroxylated solvents for the acylaminonitriles. Especially to be preferred are the diloweralkylsulfoxides such as dimethylsulfoxide, methylethylsulfoxide, diethylsulfioxide, dipropylsulfoxide, dibutylsulfoxide, and the like. However, other sulfoxides which are also liquid at the temperature of the reaction such as methylphenylsulfoxide, ditolylsulfoxide, diallysulfoxide and the like may also be used. Where the sulfoxide is a solid at room temperature, it needs only to have a melting point sufficiently low to permit it to be a liquid at the elevated temperatures used in this reaction. The acylaminonitrile is preferably used in such a concentration that there are more than 2 unit volumes of the solvent per unit weight of the nitrile. By unit volume and unit weight is meant such relationships as milliliters to grams, where the "unit volume" is defined as the volume occupied by a unit weight of water. Preferably, the concentration of the acylaminonitrile in the solvent is about 4 unit volumes per unit weight of the nitrile. Other solvents such as dimethyl formamide, diethyleneglycoldimethylether, hexamethylphosphoramide and the like can similarly be used.

Generally, the exclusion of air is desirable in running the process of this invention. In those cases where dihydroxyphenyl or dialkanoyloxy, e.g. diacetoxy, dipropionyloxy, dibutyryloxy radicals are present, such as in the compounds especially used in this invention, namely, the dihydroxybenzyl, the diacetoxybenzyl, the dipropionyloxybenzyl, the dibutyryloxybenzyl, or vanillylacylaminonitrile, it is preferable to exclude air in order to prevent decomposition of the materials being racemized due to oxidation. The exclusion of air is carried out by flushing with nitrogen and running the reaction under nitrogen.

The racemization method of this invention can be accomplished either by a batchwise process or by a continuous process. Example 12 below shows the details of one such continuous racemization process.

This invention may be illustrated by the following examples.

Example 1

A slurry of one gram of D-α-acetamido-α-vanillylpropionitrile and 100 mg. of sodium cyanide in 4 ml. of dimethylsulfoxide is purged with nitrogen. The stirred mixture is then heated rapidly to reflux 194° (dissolved salts under the boiling point) using a preheated oil bath at 200° C. in one minute and kept at the boiling point for three minutes. During this period all the solid dissolves and a pale yellow solution results. The reaction is removed from the oil bath and quickly cooled in an ice-bath to a temperature of 60–70° C. (about one minute). The excess dimethylsulfoxide is concentrated in vacuo one-two minutes in a 60–70° C. water bath.

The resulting brown viscous syrup is quenched by adding 10 ml. of 0.6 N HCl at 0° with stirring. The temperature of the quench mixture is kept at 5–10° C. Care must be exercised here since hydrogen cyanide is liberated in the operation. During stirring at 5° C. for 30 minutes the product crystallizes. This is filtered and washed successively with 2× 1 ml. water at 0–5° C. and 2× 5 ml. cold secondary butanol. The yield at this point is 916 mg. (91.6%) of racemix N-acetylaminonitrile, M.P. 171–176° C. Phase solubility analysis indicates that this is 96–97% pure.

Example 2

The procedure of Example 1 is followed using

D-α-acetamido-α-veratrylpropionitrile,
D-α-acetamido-α-3,4-dihydroxybenzylpropionitrile,
D-α-acetamido-α-p-methoxybenzylpropionitrile,
D-α-acetamido-α-p-hydroxybenzylpropionitrile,
D-α-acetamido-α-3,4-diacetoxybenzylpropionitrile,
D-α-acetamido-α-vanillylbutyronitrile,
D-α-acetamido-α-vanillylvaleronitrile and
D-α-acetamido-α-piperonylpropionitrile all obtained by resolution of the corresponding racemates, which were prepared by the action of acetic anhydride on the corresponding aminonitrile, in place of D-α-acetamido-α-vanillylpropionitrile. The products recovered are substantially to completely racemized.

The procedure of Example 1 is followed using D-α-propionylamino - α-3,4-dipropionyloxybenzylpropionitrile, D - α - butyrylamino-α-3,4-dibutryloxybenzylpropionitrile, D - α - valerylamino-α-3,4-divaleryloxybenzylpropionitrile all obtained by resolution of the corresponding racemates which were prepared by the action of the corresponding acid anhydride on D,L-α-amino-α-3,4,-dihydroxbenzyl-propionitrile.

Example 3

The procedure of Example 1 is followed using

D-α-propamido-α-vanillylpropionitrile,
D-α-butyramido-α-vanillylpropionitrile,
D-α-valeramido-α-vanillylpropionitrile,
D-α-acrylamido-α-vanillylpropionitrile,
D-α-benzamido-α-vanillylpropionitrile,
D-α-p-chlorobenzamido-α-vanillylpropionitrile,
D-α-bromobenzamido-α-vanillylpropionitrile,
D-α-p-tolamido-α-vanillylpropionitrile,
D-α-2,4-dimethylbenzamido-α-vanillylpropionitrile,
D-α-chloracetamido-α-vanillylpropionitrile,
D-α-dichloracetamino-α-vanillylpropionitrile,
D-α-trichloroacetamido-α-vanillylpropionitrile,
D-α-trifluoroacetamido-α-vanillylpropionitrile,
and D-α-phenylacetamido-α-vanillylpropionitrile all prepared by the action of the corresponding acid anhyride on DL-α-amino-α-vanillylpropionitrile, followed by resolution) in place of the nitrile used in that example. The products are substantially racemized.

Example 4

The procedure of Example 1 is followed using D-α-acetamido-α-methylpropionitrile (from acetone and ammonium cyanide, followed by acetylation with acetic anhydride and resolution), D-α-phenyl-D-α-acetamidopropionitrile (from acetophenone), D-α-benzyl-α-acetamidopropionitrile (from methylbenzyl ketone), L-α,α-diphenyl-α-acetamido-acetonitrile (from benzophenone), L-1-cyano-1-acetamidocyclohexane (from cyclohexanone), α-4-imidazolylmethyl-α-acetamidopropionitrile (from 4-imidazolylacetone) and α-5-hydroxy-3-indolyl-methyl-α-acetamidopropionitrile (from 5-hydroxy-3-indolyl acetone) in place of the nitrile used therein. The products are substantially racemized.

Example 5

The procedure of Example 1 is followed using potassium cyanide in place of sodium cyanide. Substantial racemization of the acetaminonitrile takes place.

Similarly, when lithium cyanide, tetramethyl ammonium cyanide is used, racemization is obtained.

Example 6

The procedure of Example 1 is followed using sodium hydride in place of sodium cyanide. A reduced yield of racemate is obtained. The same result is obtained when sodium carbonate is used in place of sodium cyanide.

Example 7

The procedure of Example 1 is followed using twice as much sodium cyanide. Complete racemization is observed but the yield of purified product is slightly lower after removal of the colored by-products.

When the usage of sodium cyanide is reduced to half the usage in Example 1, the racemization is only substantially complete.

Example 8

The procedure of Example 1 is followed using half the volume of dimethylsulfoxide. The yield of racemized product is slightly lower.

Example 9

The procedure of Example 1 is followed using diethylsulfoxide, dibutylsulfoxide and diphenylsulfoxide in place of dimethylsulfoxide. In the case of diphenylsulfoxide, the mixture is heated to 80° during the nitrogen purging to keep the mixture fluid. Substantial racemization occurs.

Example 10

A mixture of 1.0 grams D-acetamido-α-vanillylpropionitrile and 100 mg. of sodium cyanide in 4 ml. of dimethyl formamide is purged with nitrogen and heated at reflux (approximately 155°) for 10 minutes. The solvent is removed in vacuum and the product crystallized by stirring the residual oil with 10 ml. of 0.6 N HCl. The precipitate is filtered, washed with water and cold isopropanol, to give 940 mg. melting point 180–197° optical purity 70% (i.e. 30% racemized).

When the above procedure is followed using 4 ml. of the dimethyl ether of diethyleneglycol in place of DMF there is obtained 938 mg. melting point 190–198° with an optical purity 85% (15% racemization).

Example 11

A mixture of 2 grams of D-α-acetamido-α-vanillylpropionitrile and 200 mg. of sodium cyanide is pulverized in a mortar. The mixture is purged well with nitrogen and then placed in an oil bath preheated to 210°. The mixture gradually melts and becomes dark over a period of 5 minutes. The melt is cooled and ground up with 20 ml. of 0.6 N HCl. The dark brown solid is filtered, washed with 0.6 N HCl and water, and dried to 1.7 grams melting point 164–174°.

The material is recrystallized successively from methanol and isopropanol to give 0.98 gram melting point 175–197° optical purity 55% (i.e. 45% racemized).

Example 12

CONTINUOUS RACEMIZATION PROCESS

The apparatus for continuous racemization begins with feed reservoirs in which a mixture of acylaminonitrile, solvent and base catalyst is stored. From the feed reservoir piping leads through a flow meter and into a coil immersed in an oil bath and from the oil bath to degassing chamber from which the reaction solution is led to a concentrator, topped by a condenser. The oil bath is divided into two chambers, one chamber being used to preheat the reaction mixture and the second used for the reaction itself. The flow line passes through a coil in each section in turn. After the degassing chamber, the reaction mixture flows into a concentrator where the solvent is recovered by distillation. The concentrate is then worked up to form the racemate product.

As an alternative to the above process, the reaction mixture after passing through the coil immersed in the hot oil bath reactor can be immediately cooled and the racemate product isolated without running the reaction mixture to a concentrator to recover solvent by distillation.

PROCESS OPERATION (A) *Start up.*—The oil temperature in each chamber of the two-section bath is raised to 189° C. and this temperature is maintained throughout by mixing the oil well. With needle valve before the concentrator closed, the pressure in the distilling section is adjusted to 9 ml. absolute mercury. Cooling water is run through the condenser.

The feed solution is prepared as follows:

100 grams of sodium cyanide is added to 4 liters of dimethylsulfoxide. The cyanide is dissolved with stirring by heating to 75° C. The sodium cyanide-dimethylsulfoxide solution is then cooled to 25° C. and 1000 grams of D-α-acetamidovanillylpropionitrile is added and dissolved with stirring. Any trapped oxygen is removed from the solution by alternate applications of vacuum and nitrogen gas purges. The feed solution is then charged to the feed reservoir. The needle valve between the feed reservoir and the flow meter is opened slowly to commence flow between the top reactant. The flow rate is adjusted to 80 ml. per minute.

(B) *Operation.*—The preheater oil bath temperature is adjusted such that the feed enters the reactor section at 189° C. The reactor oil bath is maintained at about 200° C. throughout the run. A unit volume of feed takes about 2–3 minutes to pass through the coil in the reaction chamber. The pressure in the distilling section is then adjusted such that approximately one-half of the dimethylsulfoxide solvent content of the feed is distilled and condensed. When the feed solution is consumed, the reactor system is flushed with fresh dimethylsulfoxide.

(C) *Work-up.*—The volume of the concentrator bottoms is measured and sufficient water is added to reduce the dimethylsulfoxide content to about 20%. Dilute 2.5 N hydrochloric acid is then added until a pH of 2.0 is obtained. The resultant slurry is cooled to 0 to 5° C. and aged for 30 minutes. It is then filtered, washed with water until free of dimethylsulfoxide, and dried under reduced pressure at 50° C.

We claim:
1. A method of racemizing a nitrile compound of the structure

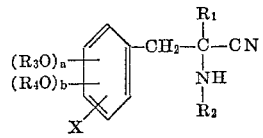

in which $R_1$ is lower alkyl, $R_2$ is selected from the group consisting of lower alkanoyl, lower alkenoyl, benzoyl, chlorobenzoyl, bromobenzoyl, toluyl, dimethylbenzoyl, trifluoro lower alkanoyl and phenyl lower alkanoyl, $R_3$ and $R_4$ are each selected from the group consisting of hydrogen, methyl, lower alkanoyl and, together when $R_3O$ and $R_4O$ are on adjacent carbons methylene, X is a member selected from the group consisting of hydrogen, lower alkyl, halogen or trifluoromethyl, $a$ being a positive whole number less than three and greater than minus one and $b$ being a whole number less than 2 and greater than minus one, which comprises treating said compound with from about 0.001 to 1 mole, per mole of said compound of a base selected from sodium cyanide, sodium hydride, sodium carbonate, potassium cyanide, potassium hydride, potassium carbonate, lithium cyanide, rubidium cyanide, cesium cyanide and tetralkylammonium cyanides.

2. The method of claim 4 in which the racemization is carried out in a non-hydroxylated high-boiling solvent for said compound selected from the group consisting of di(lower alkyl)sulfoxide, lower alkyl-phenyl sulfoxide, ditolylsulfoxide, diallylsulfoxide, di(lower alkyl)formamide, diethyleneglycol-di(lower alkyl)ether and heximethylphosphoramide.

3. The method of claim 2 in which the racemization is carried out by heating from about ambient temperature to about 200° C.

4. The method of claim 3 in which the solvent is a liquid organic sulfoxide selected from the group consisting of di(lower alkyl)sulfoxide, lower alkyl-phenylsulfoxide, ditolylsulfoxide, and diallylsulfoxide.

5. The method of claim 4 in which the said base is sodium cyanide.

6. The method of claim 5 in which the sulfoxide is dimethylsulfoxide and the racemization is carried out at 185–195° C.

7. The method of claim 6 in which the said nitrile is α-acetylamido-α-vanillylpropionitrile.

8. The method of claim 6 in which the said nitrile is α-acetamido-α-veratrylpropionitrile.

9. The method of claim 6 in which the said nitrile is α-acetamido-α-piperonylpropionitrile.

10. The method of claim 6 in which the said nitrile is α-acetamido-α-3,4-dihydroxylbenzylpropionitrile.

11. The method of claim 6 in which the said nitrile is α-acetamido-α-benzylpropionitrile.

12. The method of claim 6 in which the said nitrile is α-acetamido-α-p-methoxybenzylpropionitrile.

13. The method of claim 6 in which the said nitrile is α-acetamido-α-p-hydroxybenzylpropionitrile.

References Cited

UNITED STATES PATENTS 3,347,905  10/1967  Sletzinger et. al. -- 260—519 X

NICHOLAS S. RIZZO, *Primary Examiner*

J. H. TURNIPSEED, *Assistant Examiner.*